United States Patent
Ichige et al.

(10) Patent No.: US 9,431,787 B2
(45) Date of Patent: Aug. 30, 2016

(54) AMPLIFICATION OPTICAL FIBER AND FIBER LASER DEVICE USING THE SAME

(71) Applicant: FUJIKURA LTD., Tokyo (JP)

(72) Inventors: Tomoya Ichige, Sakura (JP); Ryuichiro Goto, Sakura (JP); Masahiro Kashiwagi, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 14/851,702

(22) Filed: Sep. 11, 2015

(65) Prior Publication Data

US 2016/0043525 A1 Feb. 11, 2016

Related U.S. Application Data

(63) Continuation of application No. PCT/JP2014/055853, filed on Mar. 6, 2014.

(30) Foreign Application Priority Data

Mar. 14, 2013 (JP) ................. 2013-051313

(51) Int. Cl.
*H01S 3/00* (2006.01)
*H01S 3/067* (2006.01)
(Continued)

(52) U.S. Cl.
CPC ........... *H01S 3/0672* (2013.01); *H01S 3/0675* (2013.01); *H01S 3/06729* (2013.01); *H01S 3/06754* (2013.01); *H01S 3/091* (2013.01); *H01S 3/09415* (2013.01); *H01S 3/1618* (2013.01); *H01S 2301/20* (2013.01)

(58) Field of Classification Search
CPC ............... H01S 3/0672; H01S 3/0675; H01S 3/06754; H01S 3/06729; H01S 3/091; H01S 3/09415; G01S 2301/20
USPC ........................................ 359/341.1
See application file for complete search history.

(56) References Cited

U.S. PATENT DOCUMENTS 5,210,816 A    5/1993   Iino et al.
5,708,669 A *   1/1998   DiGiovanni ........ H01S 3/06708
                                                                            372/6

(Continued)

FOREIGN PATENT DOCUMENTS

EP    2 696 451 A1    2/2014
JP    5-2118 A    1/1993

(Continued)

OTHER PUBLICATIONS

International Search Report dated Apr. 15, 2014, issued in counterpart application No. PCT/JP2014/055853 (2 pages).

*Primary Examiner* — Mark Hellner
(74) *Attorney, Agent, or Firm* — Westerman, Hattori, Daniels & Adrian, LLP

(57) ABSTRACT

The refractive index of the first core portion 11a is higher than that of a clad 12, and the refractive index of the second core portion 11b is higher than that of the first core portion 11a. When light of the LP01 mode and light of the LP11 mode are standardized by power, in the core 11, an active element that stimulates to emit light of the predetermined wavelength is doped at a higher concentration in at least a part of an area where power of light of the LP01 mode is larger than that of light of the LP11 mode than at least a part of an area where the power of light of the LP11 mode is larger than that of light of the LP01 mode.

13 Claims, 5 Drawing Sheets

(51) Int. Cl.
*H01S 3/091* (2006.01)
*H01S 3/0941* (2006.01)
*H01S 3/16* (2006.01)

(56) References Cited

U.S. PATENT DOCUMENTS

| | | | |
|---|---|---|---|
| 5,778,129 A | 7/1998 | Shukunami et al. | |
| 6,922,514 B2 * | 7/2005 | Tirloni | G02B 6/02009 |
| | | | 359/341.1 |
| 6,965,469 B2 * | 11/2005 | Avizonis | H01S 3/06708 |
| | | | 359/341.1 |
| 9,197,030 B2 * | 11/2015 | Bennett | H01S 3/06754 |
| 2014/0029084 A1 | 1/2014 | Kashiwagi | |

FOREIGN PATENT DOCUMENTS

| | | |
|---|---|---|
| JP | 5-119222 A | 5/1993 |
| JP | 6-157064 A | 6/1994 |
| JP | 9-197131 A | 7/1997 |
| JP | 2003-008114 A | 1/2003 |
| JP | 2011-238882 A | 11/2011 |
| JP | 4947853 B2 | 6/2012 |
| JP | 5124701 B1 | 1/2013 |

* cited by examiner

RELATIVE REFRACTIVE
INDEX DIFFERENCE

INTENSITY OF LIGHT

POWER OF LIGHT

CONCENTRATION OF
ACTIVE ELEMENT

US 9,431,787 B2

AMPLIFICATION OPTICAL FIBER AND FIBER LASER DEVICE USING THE SAME

TECHNICAL FIELD

The invention relates to an amplification optical fiber capable of emitting light having high power with an improved beam quality and a fiber laser device using the same.

BACKGROUND ART

As one of fiber laser devices used in, for example, a processing machine, there has been known an MO-PA (Master Oscillator-Power Amplifier) fiber laser device which amplifies light, generated by a seed light source such as a laser oscillator (MO: Master Oscillator), by an amplifier (PA: Power Amplifier) including an amplification optical fiber and emits the light. Light having a wavelength band of visible light has been emitted from such a fiber laser device by converting light having a wavelength band of near infrared light to the short wavelength side by using a wavelength conversion element.

Upon such wavelength conversion, wavelength conversion tends to be less effective when light before the wavelength conversion includes a higher-order mode. Thus, it is preferable that light entering a wavelength conversion element include light of the fundamental mode only and do not include light of a higher-order mode as much as possible. In addition, when the light emitted from the amplification optical fiber is focused, it is preferable that light entering a wavelength conversion element include light of the fundamental mode only and do not include light of a higher-order mode as much as possible. On the other hand, there is a demand for using, as an optical fiber such as an amplification optical fiber, an optical fiber including a core having a diameter larger than a single mode fiber in order to allow light having high power to propagate associated with higher output of a fiber laser device. Even in such a case, there is a demand for emitting light with a good beam quality, which includes light of the fundamental mode and reduced light of higher-order modes.

Patent Document 1 listed below describes an example of an amplification optical fiber including a core selectively doped with an active element in order to mainly amplify light of an LP01 mode and less amplify light of an LP11 mode comparing to the light of the LP01 mode. Such an amplification optical fiber can amplify light of the fundamental mode and suppress amplification of light of the LP11 mode at the same time. Therefore, light including light of the fundamental mode and reduced light of the LP11 mode can be emitted.

CITATION LIST

Patent Document

[Patent Document 1] JP4,947,853 B2

SUMMARY OF INVENTION

The amplification optical fiber described in above-described Patent Document 1 can selectively amplifies light of the LP01 mode in comparison with an amplification optical fiber including a core uniformly doped with an active element over the whole area thereof, and thus can emit light with a high beam quality. Meanwhile, there is a demand for an amplification optical fiber capable of emitting light having higher power associated with higher output of a fiber laser device in which the amplification optical fiber as described above is used.

Therefore, an object of the invention is to provide an amplification optical fiber capable of emitting light having high power with an improved beam quality and a fiber laser device using the same.

In the amplification fiber selectively doped with an active element, which is described in above-described Patent Document 1, power of emitted light can be increased by expanding an area in which the active element is doped. However, expansion of the area in which the active element is doped may unfortunately amplifies light of the LP11 mode. In this case, the beam quality of output light is reduced. Because of this situation, the inventors have devoted themselves to study to expand the area in which the active element is doped while suppressing reducing of the beam quality so as to make the invention.

Specifically, an amplification optical fiber of the invention comprises: a core; and a clad surrounding the core, the amplification optical fiber allowing light having a predetermined wavelength to propagate in at least an LP01 mode and an LP11 mode, wherein the core includes a first core portion covering a center area of the core and a second core portion surrounding the first core portion, a refractive index of the first core portion is higher than that of the clad, a refractive index of the second core portion is higher than that of the first core portion, when light of the LP01 mode and light of the LP11 mode are standardized by power, in the core, an active element that stimulates to emit light of the predetermined wavelength is doped at a higher concentration in at least a part of an area where power of light of the LP01 mode is larger than that of light of the LP11 mode than at least a part of an area where the power of light of the LP11 mode is larger than that of light of the LP01 mode to satisfy the formula:

$$\int_0^\infty n(r) \times \{I_{01}(r) - I_{11}(r)\} r \, dr > 0$$

(where, r represents a distance from the center in the radial direction of the core, $I_{01}(r)$ represents the power of light of the LP01 mode at the distance r from the center in the radial direction of the core, $I_{11}(r)$ represents the power of light of the LP11 mode at the distance r from the center in the radial direction of the core, and n(r) represents an additive concentration of the active element at the distance r from the center in the radial direction of the core).

The intensity of light of the LP01 mode, which is one of even modes, is the highest at the center of the core and gradually reduced further away from the center of the core. On the other hand, the intensity of light of the LP11 mode, which is an odd mode, is substantially zero at the center of the core and is gradually increased further away from the center of the core, and is the highest at a position at a certain distance away from the center of the core. Therefore, much light of the LP11 mode included in emitted light causes inconvenience of difficulty, for example, in focusing the light. When light of the LP01 mode and light of the LP11 mode propagating through the core are standardized by power, an area where the power of the light of the LP01 mode is higher than that of the light of the LP11 mode covers the center of the core and expands to a predetermined position, and an area on the outer peripheral side of the area is an area where the power of the light of the LP11 mode is higher than that of the light of the LP01. The inventors focused on the fact that a portion where the power of the LP01 mode is larger and a portion where the power of light of the LP11 mode is larger can be substantially divided. According to the amplification optical fiber of the invention, an active element is doped at a higher concentration in at least a part of an area where power of light of the LP01 mode is larger than that of light of the LP11 mode than at least a part of an area where the power of light of the LP11 mode is larger than that of light of the LP01 mode to satisfy the above formula. Therefore, light of the LP01 mode is amplified and amplification of light of the LP11 mode is suppressed in the amplification optical fiber as a whole. Accordingly, the beam quality of output light can be improved.

In addition, the second core portion has a refractive index higher than that of the first core portion positioned on the inner peripheral side. Thus, light propagating through the core is drawn toward the second core portion having a higher refractive index. Specifically, light propagating through the core propagates while drawn toward the outer peripheral in comparison with a case where the core has a uniform refractive index in the whole of the core. Therefore, both of light of the LP01 mode and light of the LP11 mode propagate through the core while drawn toward the outer peripheral. Therefore, a position where the power of the light of the LP01 mode and the power of the light of the LP11 mode are identical is also drawn toward the outer peripheral when they are standardized by power. As described above, in an area on the center side of the core, the power of light of the LP01 mode is larger than that of light of the LP11 mode. Thus, an area where more light of the LP01 mode exists than light of the LP11 mode expands in comparison with a case where the core has a uniform refractive index in the whole of the core because of the higher refractive index of the second core portion than the refractive index of the first core portion. The expansion of the area where more light of the LP01 mode exists than light of the LP11 mode can increase an area in which an active element is doped to satisfy the above formula. Therefore, an amplification optical fiber according to the invention can emit light having high power with an improved beam quality.

In addition, since light propagating through the core can be drawn toward the outer peripheral, and thus an effective area can be enlarged. Therefore, the density of light propagating through the core can be small and the effect of the nonlinear optical effect can be suppressed even when the power of light is increased.

The second core portion is preferably formed on an outer peripheral side of a position where the power of light of the LP01 mode and the power of light of the LP11 mode are identical when light of the LP01 mode and light of the LP11 mode are standardized by power.

With such a configuration, light of the LP11 mode is more strongly influenced by the second core portion and is drawn further toward the outer peripheral in comparison with light of the LP01 mode. Thus, the area where the LP01 mode is larger than the LP11 mode can be expanded more, and the area in which an active element is doped to satisfy the above formula can be expanded more.

A peak of the power of light of the LP11 mode is preferably positioned in the second core portion when light of the LP11 mode is standardized by power.

An average concentration of the active element doped in the first core portion is preferably higher than an average concentration of the active element in the second core portion.

The active element is preferably not doped in the second core portion. In other words, an average concentration of the active element doped in the second core portion is zero.

The active element is preferably doped in an area from the center of the core to a position where the power of light of the LP01 mode and the power of light of the LP11 mode are identical when light of the LP01 mode and light of the LP11 mode are standardized by power.

The active element is doped in this manner, whereby light of the LP01 mode can be amplified at a higher amplification factor than light of the LP11 mode, and thus light with a good beam quality can be emitted.

In this case, the active element is preferably doped at a uniform concentration.

The active element may be doped in an area from the center of the core to a predetermined position at a uniform concentration.

In this case, the predetermined position may be set to be position where the power of light of the LP01 mode and the power of light of the LP11 mode are identical when light of the LP01 mode and light of the LP11 mode are standardized by power.

The active element is preferably not doped in an area where the power of light of the LP11 mode is larger than that of light of the LP01 mode when light of the LP01 mode and light of the LP11 mode are standardized by power.

The active element is doped in this manner, whereby light of the LP01 mode can be amplified at a higher amplification factor than light of the LP11 mode, and thus light with a good beam quality can be emitted.

A fiber laser device comprises: any one of the amplification optical fibers described above; a seed light source which inputs seed light to the amplification optical fiber; and a pumping light source which outputs pumping light pumping the active element of the amplification optical fiber. Alternatively, a fiber laser device comprises: any one of the amplification optical fibers described above; a pumping light source which outputs pumping light pumping the active element of the amplification optical fiber; a first FBG which is provided on one side of the amplification optical fiber and reflects light with at least a part of a wavelength of light emitted by the active element pumped by the pumping light; and a second FBG which is provided on the other side of the amplification optical fiber and reflects light with the same wavelength as the light, reflected by the first FBG, at a lower reflectance than the first FBG.

According to these fiber laser devices, an area where the power of light of the LP01 mode is larger than that of light of the LP11 mode is expanded, and light of the LP01 mode is amplified and amplification of light of the LP11 mode is suppressed. Thus, these fiber laser devices can emit light having high power with an improved beam quality.

As described above, an amplification optical fiber capable of emitting light having high power with an improved beam quality and a fiber laser device using the same can be provided according to the invention.

DESCRIPTION OF EMBODIMENTS

Figure 1:
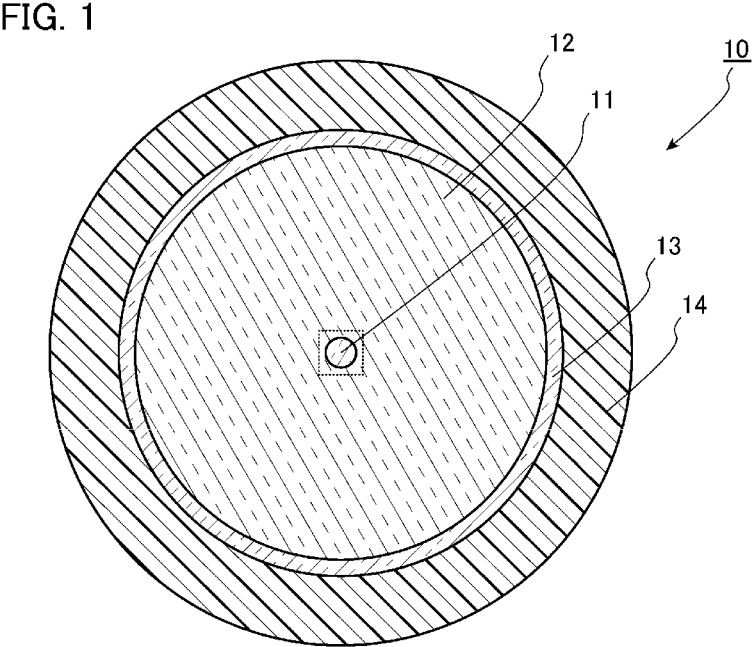
FIG. 1 is a view showing a structure of a cross-section perpendicular to the longitudinal direction of the amplification optical fiber of the invention.

Suitable embodiments of an amplification optical fiber and a fiber laser device using the same according to the invention will be explained in detail hereinafter referring to the drawings. For easy understanding, scales of the respective drawings and scales provided in description below may be different.

<Description Regarding Amplification Optical Fiber>

FIG. 1 is a view showing appearance of a cross-section perpendicular to the longitudinal direction of an amplification optical fiber according to a first embodiment of the invention.

As shown in FIG. 1, an amplification optical fiber 10 includes, as main components: a core 11; an inner clad 12 surrounding the outer peripheral surface of the core 11 without any gap; an outer clad 13 coating the outer peripheral surface of the inner clad 12; and a coating layer 14 coating the outer clad 13. The core 11 is formed to have a diameter of, for example, 26 µm. The inner clad 12 is formed to have an outer diameter of, for example, 420 µm, and the outer clad 13 is formed to have an outer diameter of, for example, 440 µm.

FIG. 2 is a view showing appearance of the core 11 of the amplification optical fiber 10 of FIG. 1 and surrounding thereof. More specifically, FIG. 2A shows the core 11 and the inner clad 12 in an area surrounded by a dotted line of FIG. 1, FIG. 2B shows distribution of relative refractive index difference of the core 11 with respect to the inner clad 12, FIG. 2C shows intensity distribution of light of the LP01 mode and light of the LP11 mode when light having a predetermined wavelength propagates through the amplification optical fiber 10, FIG. 2D shows power distribution of light of the LP01 mode and light of the LP11 mode shown in FIG. 2C respectively that are standardized by power, and FIG. 2E shows concentration distribution of active element in the area shown in FIG. 2A.

Figure 2A:
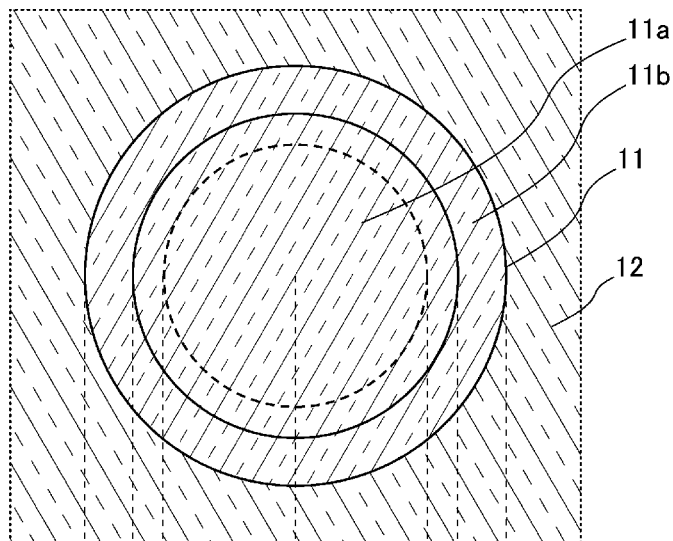
FIG. 2A-FIG. 2E are views showing an area surrounded by a dotted line in FIG. 1.

As shown in FIG. 2A, the core 11 of the amplification optical fiber 10 includes a first core portion 11a expanding from the center of the core 11 to a certain area and a second core portion 11b surrounding the outer peripheral surface of the first core portion 11a without any gap. The diameter of the first core portion 11a is set to be, for example, 20 µm when the diameter of the core 11 is, for example, 26 µm, and the outer diameter of the second core portion 11b is set to be 26 µm, which is identical to the diameter of the core 11.

Figure 2B:
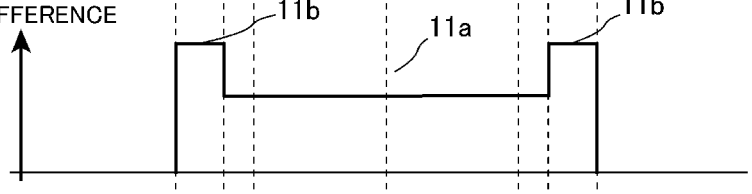

As shown in FIG. 2B, the refractive index of the second core portion 11b is set to be higher than that of the first core portion 11a, and the refractive index of the first core portion 11a is set to be higher than that of the inner clad 12. The refractive index of the outer clad 13 is set to be lower than that of the inner clad 12 although it is not particularly shown.

The relative refractive index difference between the first core portion 11a and the inner clad 12 may be set to, for example, 0.12, and the relative refractive index difference between the second core portion 11b and the inner clad 12 may be set to, for example, 0.20. In order that the amplification optical fiber 10 has the above-described refractive index profile, the first core portion 11a and the second core portion 11b are respectively formed of silica doped with dopant such as germanium increasing the refractive index and other necessary dopants. The dopant doped in the second core portion 11b to increase the refractive index is doped to make a concentration higher than the first core 11 portion a. In this case, the inner clad 12 is formed of, for example, pure silica doped with no dopant. In addition, the outer clad 13 is formed of, for example, an ultraviolet curable resin or silica doped with dopant decreasing the refractive index, and the coating layer is formed of an ultraviolet curable resin different from that of the outer clad.

Figure 2C:
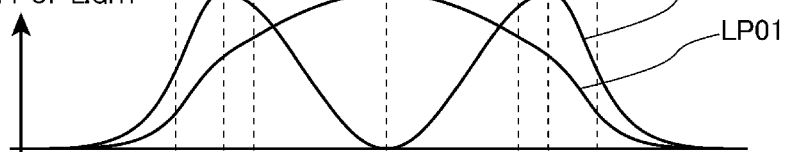

As shown in FIG. 2C, the amplification optical fiber 10 is an optical fiber including the core 11 through which light of a higher-order mode such as the LP11 mode propagates in addition to light of the LP01 mode, which is the fundamental mode. When light having a predetermined wavelength propagates through the core 11, the light propagates through the core 11 as light including the LP01 mode and the LP11 mode. For example, when light including light of the LP01 mode only enters the core 11, light of a higher-order mode such as the LP11 mode may be excited. Light of the LP01 mode has large intensity at the center of the core 11 and the intensity becomes less at positions farther from the center of the core 11. On the other hand, light of the LP11 mode has small intensity at the center of the core 11 and large intensity on the outer peripheral side of the core 11. Therefore, much light of the LP11 mode included in emitted light causes inconvenience of difficulty, for example, in focusing the emitted light. Light of the LP11 mode in light of odd modes particularly has large effect on the inconvenience, for example, in focusing. Thus, in the embodiment, only light of the LP11 mode having larger influence than other higher-order modes is considered and light of other higher-order modes or light of even modes such as an LP02 mode (axisymmetric light) is not particularly considered. The wavelength of light propagating through the core 11 is set to be a wavelength allowing an active element to cause stimulated emission when the active element doped to the core 11 is excited as described later in detail.

Figure 2D:
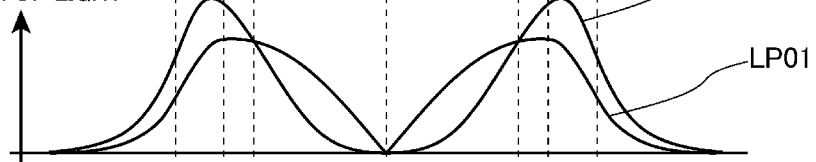

When light including light of the LP01 mode and light of the LP11 mode propagates through the core 11, the light of the LP01 mode and the light of LP11 mode propagate with power distribution as shown in FIG. 2D when the light of the LP01 mode and the light of the LP11 mode are standardized by power. At this time, an area AR01 where the power of the light of the LP01 mode is higher than that of the light of the LP11 mode covers the center of the core 11 and expands to a predetermined position, and an area AR11 where the power of the light of the LP11 mode is higher than that of the light of the LP01 is an area on the outer peripheral side of the area AR01.

In the embodiment, as is clear from FIGS. 2B and 2D, the second core portion 11b is formed on the outer peripheral side of a position where the power of the light of the LP01 mode and the power of the light of the LP11 mode are identical, that is the boundary between the areas AR01 and AR11 when the light of the LP01 mode and the light of the LP11 mode are standardized by power. Therefore, the first core portion 11a includes the area AR01 on the inner side and the area AR11 on the outer side and the whole of the second core portion 11b is the area AR11. The peak of the power of the light of the LP11 mode is positioned in the second core portion 11b.

Figure 2E:
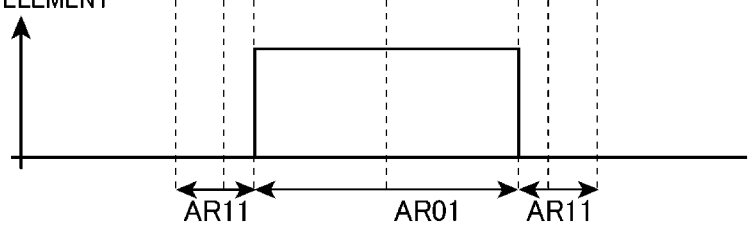

As shown in FIG. 2E, in the amplification optical fiber 10 of this embodiment, an active element is doped only in the area AR01 and is not doped in the area AR11. Specifically, in the first core portion 11a, only the area AR11 is doped with an active element and the second core portion 11b is not doped with any active element. The active element is an element pumped by the pumping light and may be ytterbium (Yb) as a typical example. Examples of such an active element include not only ytterbium (Yb) but also a rare-earth element such as neodymium (Nd) and erbium (Er). Examples of the active element further include bismuth (Bi) in addition to the rare-earth element. The concentration of an active element doped in the area AR01 is set to be $16 \times 10^{25}$ (pieces/m$^3$) when, for example, the active element is ytterbium. The wavelength of the light propagating through the core is set to be a predetermined wavelength allowing the pumped active element as described above to cause stimulated emission and is set to, for example, 1070 nm when the active element is ytterbium When light having the predetermined wavelength enters the core 11 of the amplification optical fiber 10 as described above and the light having the wavelength that pumps the active element also enters the inner clad 12, the light having entered the core 11 is amplified. Pumping light entering the inner clad 12 propagates mainly through the inner clad 12 and pumps the active element doped in the core 11 when the pumping light passes the core 11. The pumped active element causes stimulated emission by the light having the predetermined wavelength, which has entered the core 11 and propagates through the core 11. The stimulated emission amplifies the light having the predetermined wavelength propagating through the core 11. At this time, in the core 11, the area AR01 where light of the LP01 mode is larger is doped with the active element but the area AR11 where the intensity of light of the LP11 mode is larger than the intensity of light of the LP01 mode is not doped with the active element. Thus, in the light propagating through the core, the light of the LP01 mode is amplified at a higher amplification factor than the light of the LP11 mode.

The light propagating through the core 11 at this time satisfies the following formula (1).

$$\int_0^\infty n(r) \times \{I_{01}(r) - I_{11}(r)\} r dr > 0 \quad (1)$$

In the above formula, r represents a distance from the center in the radial direction of the core 11, $I_{01}(r)$ represents power of light of the LP01 mode shown in FIG. 2D at the distance r from the center in the radial direction of the core 11, $I_{11}(r)$ represents power of light of the LP11 mode at the distance r from the center in the radial direction of the core 11, and n(r) represents an additive concentration of the active element at the distance r from the center in the radial direction of the core 11. The unit of r is (m), the unit of $I_{01}(r)$, $I_{O2}(r)$ is (W/m$^2$), and the unit of n(r) is (piece/m$^3$).

Therefore, in comparison with an amplification optical fiber including a core whole of which is doped with an active element at a uniform concentration, the amplification optical fiber 10 of this embodiment amplifies light of the LP01 mode more efficiently than light of the LP11 mode and emits the light.

Next, an effect of a higher refractive index of the second core portion 11b than that of the first core portion 11a in the embodiment is described.

Figure 3:
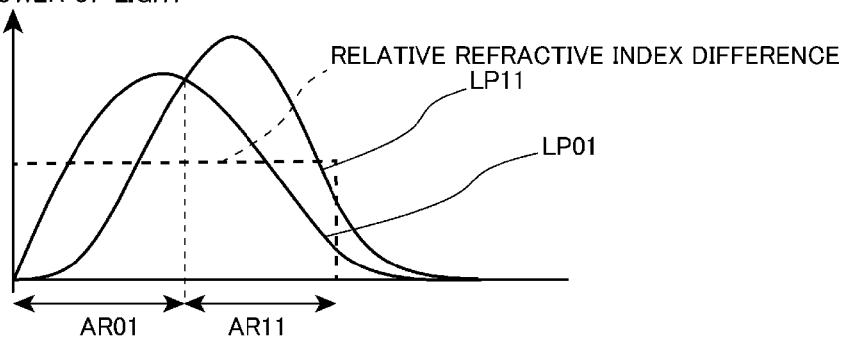
FIG. 3 is a view showing a refractive index profile and power distribution of light of the LP01 mode and light of the LP11 mode relating to an optical fiber including the core having a uniform refractive index in the whole of the core.
Figure 4:
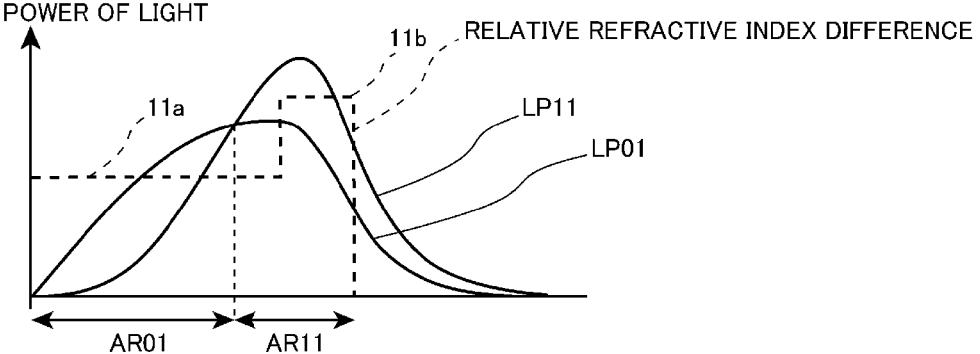
FIG. 4 is a view showing a refractive index profile and power distribution of light of the LP01 mode and light of the LP11 mode relating to the amplification optical fiber of the invention.

FIG. 3 is a view showing distribution of relative refractive index difference of a core with respect to a clad and showing power distribution of light of the LP01 mode and light of the LP11 mode in light propagating through the core when they are standardized by power relating to an optical fiber including the core having a uniform refractive index in the whole of the core. FIG. 4 is a view showing distribution of relative refractive index difference of the core 11 with respect to the inner clad 12 and showing power distribution of light of the LP01 mode and light of the LP11 mode in light propagating through the core 11 when they are standardized by power relating to the amplification optical fiber 10 of the invention. Since the distribution of relative refractive index difference and the distribution of power are symmetrical about the center of the core, distributions of only one side of the center are shown in FIGS. 3 and 4 and distributions on the other side are not shown, and distribution of the relative refractive index difference is shown in a broken line.

As is clear from FIGS. 3 and 4, in the refractive index profile of the core 11 of the amplification optical fiber 10 of the embodiment shown in FIG. 4, the light of the LP01 mode and the light of the LP11 mode are respectively drawn toward the outer peripheral in comparison with the case where the core has a uniform refractive index in the whole of the core as shown in FIG. 3. Therefore, a position where the power of the light of the LP01 mode and the power of the light of the LP11 mode are identical is also drawn toward the outer peripheral in the amplification optical fiber 10 of the embodiment. When the light of the LP01 mode and the light of the LP11 mode are standardized by power as described above, the area AR01 where the power of the light of the LP01 mode is higher than that of the light of the LP11 mode expands from the center of the core 11 to a predetermined position. Therefore, according to the amplification optical fiber 10 of the embodiment as shown in FIG. 4, the area AR01 where the power of the light of the LP01 mode is higher than that of the light of the LP11 mode is larger in comparison with an optical fiber including a core having a uniform refractive index in the whole of the core as shown in FIG. 3. The expansion of the area AR01 where the power of the light of the LP01 mode is higher than that of the light of the LP11 mode expands an area where the light of LP01 mode can be amplified more than the light of the LP11 mode. Therefore, the amplification optical fiber 10 of the embodiment can emit light having higher power with a good beam quality by selectively doping an active element.

In addition, light propagating through the core 11 can be drawn toward the outer peripheral as shown in FIG. 4, and thus the amplification optical fiber 10 can enlarge an effective area ($A_{eff}$). Therefore, the density of light propagating through the core can be small and the effect of the nonlinear optical effect can be suppressed even when the power of light is increased.

<Description Regarding Fiber Laser Device>

Figure 5:
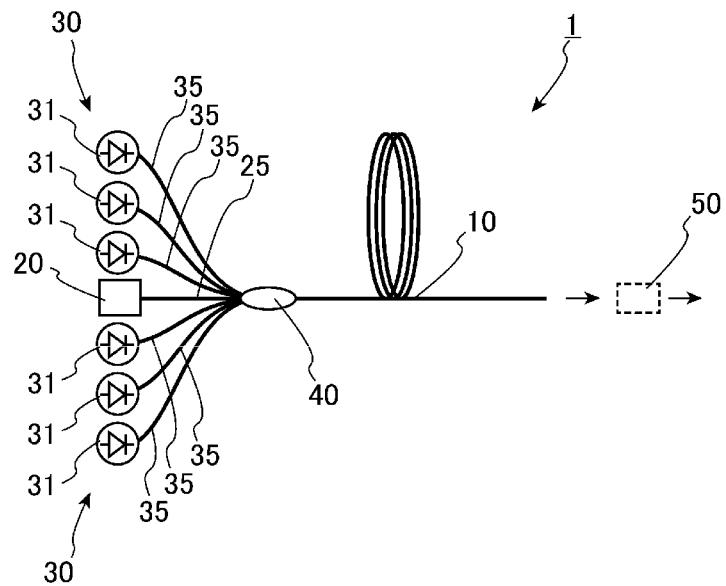
FIG. 5 is a view showing an example of a fiber laser device of the invention.

Next, a fiber laser device using the amplification optical fiber 10 is described with reference to FIG. 5. FIG. 5 is a view showing an example of the fiber laser device of the embodiment. As shown in FIG. 5, a fiber laser device 1 in the embodiment mainly includes a seed light source 20 emitting light as seed light, a pumping light source 30 emitting pumping light, an optical combiner 40 to which the seed light and the pumping light are input, and the amplification optical fiber 10 of FIG. 1 to which the seed light and the pumping light emitted from the optical combiner 40 enter.

The seed light source 20 is constituted of, for example, a semiconductor laser device and a Fabry-Perot type or fibering type fiber laser device. The seed light source 20 is configured to emit light of a predetermined wavelength including light of the LP01 mode from an optical fiber. The predetermined wavelength is not particularly limited but is a wavelength that allows an active element doped in the amplification optical fiber 10 to cause stimulated emission. When the active element is ytterbium (Yb), for example, the predetermined wavelength is set to 1070 nm.

Light emitted from the seed light source 20 is emitted from an optical fiber 25 including a core and a clad coating the core. Through the optical fiber 25, light emitted from the seed light source 20 propagates as single mode light including light of, for example, the LP01 mode.

The pumping light source 30 may be configured by a plurality of laser diodes 31. The laser diodes 31 are Fabry-perot type semiconductor laser diodes of GaAs-based semiconductor that emit light having the center wavelength of 915 nm, for example, in the embodiment. The respective laser diodes 31 of the pumping light source 30 are connected to optical fibers 35, and pumping light emitted from the laser diodes 31 propagates through the optical fibers 35 as multi mode light, for example.

The optical combiner 40 to which the optical fibers 35 and the optical fiber 25 are connected is configured by the optical fiber 25 and the multi-mode fibers arranged around the optical fiber 25 that are melt and stretched to be integrated. The core of the optical fiber 25 and the core 11 of the amplification optical fiber 10 are optically coupled and the cores of the optical fibers 35 and the inner clad 12 of the amplification optical fiber 10 are optically coupled.

Next, the operation of the fiber laser device 1 will be described.

First, seed light emitted from the seed light source 20 is emitted from the optical fiber 25. The wavelength of the seed light is, for example, 1070 μm as described above. At this time, through the above-described optical fiber 25, the seed light including the LP01 mode propagates. The seed light propagating through the optical fiber 25 then enters the optical combiner 40.

The pumping light source 30 emits pumping light for pumping an active element doped in the core 11 of the amplification optical fiber 10. The wavelength at this time is set to 915 μm as described above, for example. The pumping light emitted from the pumping light source 30 then propagates through the optical fibers 35 and enters the optical combiner 40.

When seed light from the optical combiner 40 enters the core 11 of the amplification optical fiber 10, the seed light may excite light of the LP11 mode as described in the description of the amplification optical fiber 10. The seed light having entered the core 11 then propagates through the core 11. The pumping light having entered the inner clad 12 of the amplification optical fiber 10 from the optical combiner 40 mainly propagates through the inner clad 12 and pumps the active element doped in the core 11 when the pumping light passes the core 11. The active element in the pumped state causes stimulated emission by the seed light, and the seed light is then amplified. At this time, even when the light of the LP11 mode is excited and propagates through the core 11, the light of the LP01 mode is amplified more than the light of the LP11 mode as described in the description of the amplification optical fiber 10. Thus, in comparison with an amplification optical fiber including a core whole of which is doped with an active element at a uniform concentration, light of the LP01 mode is amplified more efficiently than light of the LP11 mode and emitted. Therefore, light including the light of the LP11 mode having suppressed intensity in comparison with that of the light of the LP01 mode with a good beam quality is emitted from the amplification optical fiber 10.

As described above, according to the fiber laser device 1 of the embodiment, light of the LP01 can be amplified while suppressing amplification of light of the LP11 mode in the amplification optical fiber 10, and thus the fiber laser device 1 can emit light with a good beam quality.

<Description Regarding Another Example of Fiber Laser Device>

Next, another example of fiber laser device will be described in detail with reference to FIG. 6. Here, components that are identical or similar to those in the description of the fiber laser device 1 are indicated by the same reference numerals and the same description will not be repeated unless otherwise particularly mentioned.

Figure 6:
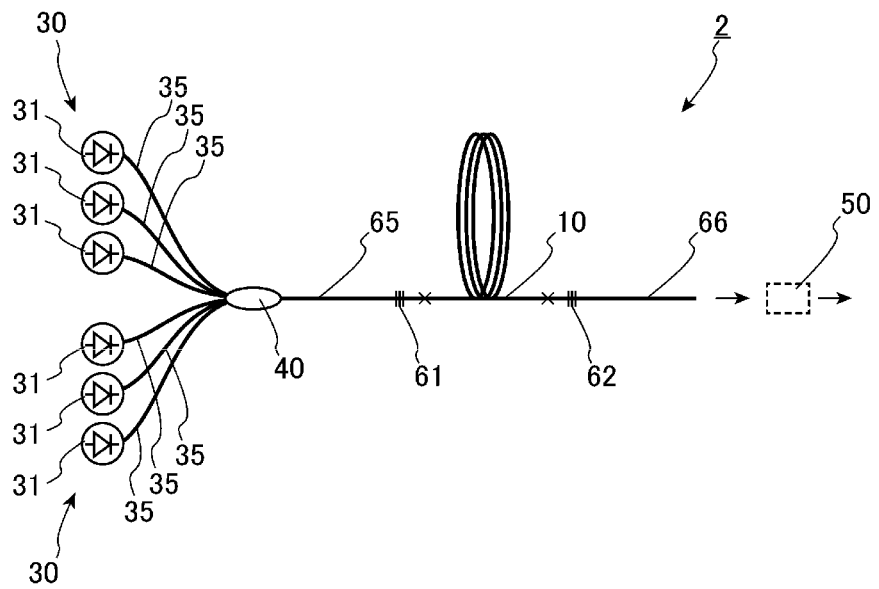
FIG. 6 is a view showing another example of the fiber laser device of the invention.

FIG. 6 is a view showing another example of the fiber laser device of the embodiment. As shown in FIG. 6, a fiber laser device 2 of this embodiment mainly includes a pumping light source 30, an amplification optical fiber 10, an optical combiner 40, a double-clad fiber 65 provided between the amplification optical fiber 10 and the optical combiner 40, a first FBG 61 provided at the double-clad fiber 65, an optical fiber 66 provided on the opposite side of the double-clad fiber 65 of the amplification optical fiber 10, and a second FBG 62 provided at the optical fiber 66.

The double-clad fiber 65 has the structure of a cross-section perpendicular to the longitudinal direction similar to that of the amplification optical fiber 10, and the double-clad fiber 65 is constituted of a core, an inner clad surrounding the outer peripheral surface of the core without any gap, an outer clad coating the outer peripheral surface of the inner clad, and a coating layer coating the outer clad. The double-clad fiber 65 is configured similarly to the amplification optical fiber 10 except that no active element is doped in the core and the core has a uniform refractive index in the whole of the core (for example, the refractive index same as that of the first core portion 11a of the amplification optical fiber 10), for example.

At one end of the double-clad fiber 65, the cores of the optical fibers 35 and the inner clad of the double-clad fiber 65 are optically connected at the optical combiner 40 similarly to the fiber laser device 1 where the amplification optical fiber 10 is connected to the optical fibers 35 at the optical combiner 40. The other end of the double-clad fiber 65 is connected to one end of the amplification optical fiber 10. The core of the double-clad fiber 65 and the core 11 of the amplification optical fiber 10 are connected. The inner clad of the double-clad fiber 65 and the inner clad 12 of the amplification optical fiber 10 are connected.

The core of the double-clad fiber 65 has the first FBG 61. Thus, the first FBG 61 is provided on one side of the amplification optical fiber 10. In the first FBG 61, portions where the refractive index becomes high are repeated at a certain period along the longitudinal direction of the double-clad fiber 65. The period is adjusted, whereby at least a portion of the wavelength of light emitted by the active element of the amplification optical fiber 10 in the pumped state is reflected. In the first FBG 61, when the active element is ytterbium as described above, the reflectance is 100% at 1070 nm, for example.

The optical fiber 66 provided on the opposite side of the double-clad fiber 65 of the amplification optical fiber 10 is constituted of a core, a clad surrounding the outer peripheral surface of the core without any gap, and a coating layer coating the clad. The core of the optical fiber 66 is configured similarly to the core 11 of the amplification optical fiber 10 except that no active element is doped in the core and the core has a uniform refractive index in the whole of the core (for example, the refractive index is the same as that of the first core portion 11a of the amplification optical fiber 10), for example. The clad of the optical fiber 66 is configured similarly to the clad of the amplification optical fiber 10.

One end of the optical fiber 66 is connected to the other end of the amplification optical fiber 10. The core 11 of the amplification optical fiber 10 and the core of the optical fiber 66 are connected. In this embodiment, nothing is connected to the other end of the optical fiber 66 so that the other end is a free end.

The core of the optical fiber 66 has the second FBG 62. Thus, the second FBG 62 is provided on the other side of the amplification optical fiber 10. In the second FBG 62, portions where the refractive index becomes high are repeated at a certain period along the longitudinal direction of the optical fiber 66, and light of the same wavelength as the light reflected by the first FBG 61 is reflected at a lower reflectance than the first FBG 61. For example, light of the same wavelength as the light reflected by the first FBG 61 is reflected at a reflectance of 50%.

In the fiber laser device 2, when the pumping light is emitted from each laser diode 31 of the pumping light source 30, the pumping light is input to the clad of the double-clad fiber 65 in the optical combiner 40 to be input from the clad of the double-clad fiber 65 to the clad of the amplification optical fiber 10. Similarly to the fiber laser device 1, active element doped in the core 11 of the amplification optical fiber 10 is pumped. The active element in the pumped state emits spontaneous emission light of a specified wavelength. The spontaneous emission light at this time is, for example, light having a certain band that includes a wavelength of 1070 nm. The spontaneous emission light propagates through the core 11 of the amplification optical fiber 10 to be reflected by the first FBG 61 provided at the core of the double-clad fiber 65. The reflected light is reflected by the second FBG 62, and light resonance occurs. The resonating light is amplified while propagating through the core 11 of the amplification optical fiber 10. At this time, the light propagating through the core 11 includes light of the LP01 mode. The light of the LP11 mode may be excited when light is reflected at the first FBG 61 or the second FBG 62, and the light propagates through the boundary between the double-clad fiber 65 or the optical fiber 66 and the amplification optical fiber 10. In such a case, the light propagating through the core 11 includes light of the LP11 mode in addition to the light of the LP01 mode.

However, even when the light includes light of the LP11 mode in addition to light of the LP01 mode, the light of the LP01 mode can be amplified while suppressing amplification of the light of the LP11 mode in the amplification optical fiber 10 similarly to the fiber laser device 1.

As described above, the fiber laser device 2 of this embodiment can emit light with a good beam quality similarly to the fiber laser device 2.

Note that, in this embodiment, the double-clad fiber 65 is not an essential component. When the double-clad fiber 65 is not provided, the amplification optical fiber 10 may be connected to the optical fibers 35 at the optical combiner 40, and the first FBG 61 may be provided on one side of the amplification optical fiber 10 similarly to the fiber laser device 1. In addition, in this embodiment, the optical fiber 66 is not an essential component. When the optical fiber 66 is not provided, the second FBG 62 may be provided on the other side of the amplification optical fiber 10.

Furthermore, as shown in broken lines in FIGS. 5 and 6, a wavelength conversion element 50 converting a wavelength of emitted light may be arranged on the path of light emitted from the fiber laser devices 1 and 2.

The wavelength conversion element 50 is an element for emitting light obtained through wavelength conversion for converting the wavelength of entered light toward the long wavelength side. For example, when near infrared light having a wavelength of 1070 nm enters, the wavelength conversion element 50 converts the wavelength of the light and emits visible light having a wavelength of 535 nm. Examples of the wavelength conversion element 50 as described above include an optical fiber causing stimulated Raman scattering. Examples of the optical fiber causing stimulated Raman scattering include an optical fiber including a core doped with a dopant that increases a nonlinear optical constant. Examples of the dopants as described above include germanium and phosphorus. In this case, the wavelength conversion element 50 generally performs wavelength conversion when light having a predetermined intensity or higher. The threshold of the intensity of entered light on which wavelength conversion is performed can be changed by changing the diameter of a core, an additive concentration of a dopant, the length of the core, and the like. Alternatively, examples of the wavelength conversion element 50 include a wavelength conversion element comprising single crystals of lithium niobate and lithium tantalate.

When the wavelength conversion element 50 described above is arranged, light emitted from the amplification optical fiber 10 and the optical fiber 66 is focused by a lens, which is not shown, and enters the wavelength conversion element 50. At this time, light with a good beam quality is emitted from the amplification optical fiber 10 and the optical fiber 66, so that focusing of light entering the wavelength conversion element 50 can be improved. Such improvement of focusing of light increases power density of light and improves conversion efficiency at the wavelength conversion element 50.

Although the invention has been described above by reference to certain embodiments as examples, the invention is not limited thereto.

Figure 7:
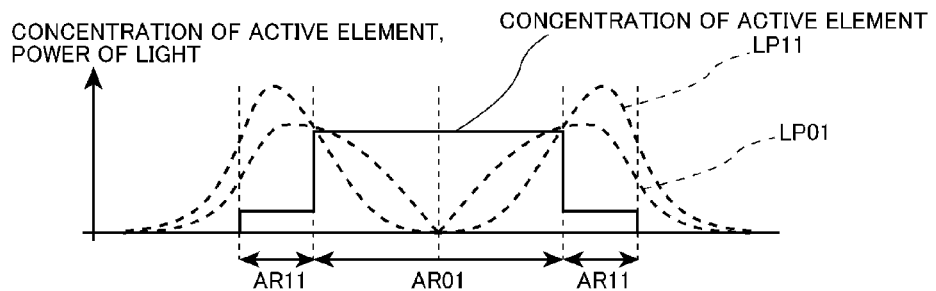
FIG. 7 is a view showing a first variant of concentration distribution of an active element.

For example, in the amplification optical fiber 10 of the embodiment described above, an active element is doped in the area AR01 where light of the LP01 mode has larger power than light of the LP11 mode and no active element is doped in the area AR11 where light of the LP11 mode has larger power than light of the LP01 mode when the light of the LP01 mode and the light of the LP11 mode are standardized by power. However, the invention is not limited thereto. FIG. 7 is a view showing a first variant of concentration distribution of an active element. As shown in FIG. 7, an active element may be doped in the area AR11 at a lower concentration than the area AR01. In this case, the concentration of an active element doped in the area AR11 is adjusted to satisfy the above formula (1). By doping an active element such that the above formula (1) is satisfied, light of the LP01 mode is amplified at a higher amplification factor than light of the LP11 mode, light with a good beam quality can be emitted, and light can be amplified at a high amplification factor as the whole amplification optical fiber due to the active element doped in the area AR11. Since in the area AR11, light of the LP11 mode is amplified at a higher amplification factor than light of the LP01 mode, the beam quality of emitted light, however, is better in the case where the active element is doped only in the area AR01 as it is in the amplification optical fiber 10 of the embodiment described above.

Figure 8:
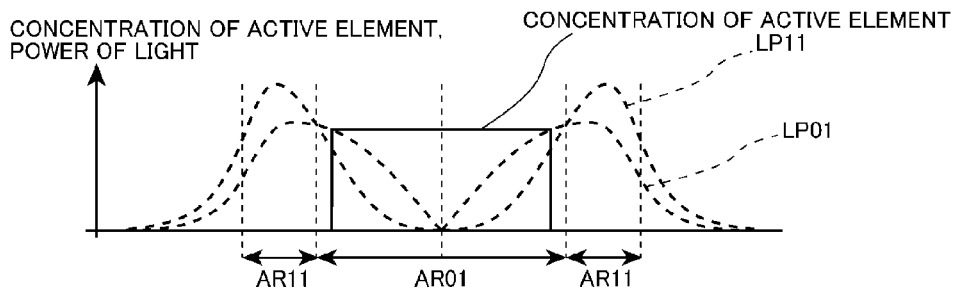
FIG. 8 is a view showing a second variant of concentration distribution of an active element.

FIG. 8 is a view showing a second variant of concentration distribution of an active element. As shown in FIG. 8, an active element may be doped in the inner peripheral side of the area AR11 at the same concentration as the AR01. In this case, the area of the inner peripheral side of the area AR11 where the active element is doped is adjusted to satisfy the above formula (1). Also in this variant, by doping an active element such that the above formula is satisfied, light of the LP01 mode is amplified at a higher amplification factor than light of the LP11 mode, light with a good beam quality can be emitted, and light can be amplified at a high amplification factor as the whole amplification optical fiber due to the active element doped in the area AR11. Since in the area AR11, light of the LP11 mode is amplified at a higher amplification factor than light of the LP01 mode, the beam quality of emitted light, however, is better in the case where the active element is doped only in the area AR01 as it is in the amplification optical fiber 10 of the embodiment described above.

Figure 9:
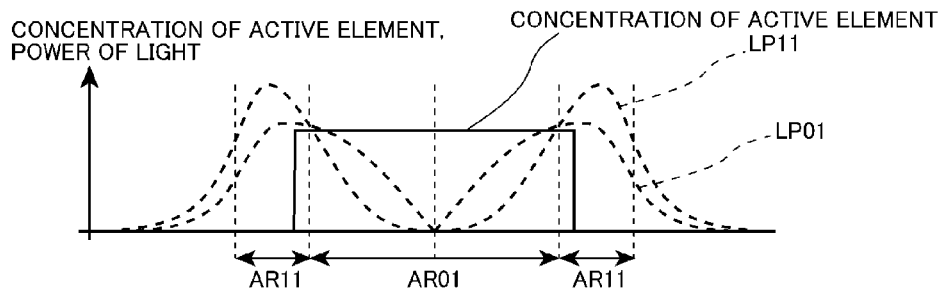
FIG. 9 is a view showing a third variant of concentration distribution of an active element.

FIG. 9 is a view showing a third variant of concentration distribution of an active element. As shown in FIG. 9, no active element may be doped in the outer peripheral side of the area AR01. Also in this case, the above formula (1) is satisfied. Also in this variant, the above formula (1) is satisfied. Therefore, light of the LP01 mode is amplified at a higher amplification factor than light of the LP11 mode, light with a good beam quality can be emitted, and light can be amplified at a high amplification factor as the whole amplification optical fiber due to the active element doped in the area AR11. However, the active element is not doped in a part of the area AR01, and thus the amplification optical fiber 10 of the above described embodiment can amplify light at a higher amplification factor.

In addition, whole of the first core portion 11a may be doped with an active element and the second core portion 11b may not be doped with an active element such that the above formula (1) is satisfied although it is not particularly shown. Furthermore, in the above described embodiment and the first to third variants, a concentration of an active element may be lower in a part of the area AR01 and a concentration of an active element of the area AR11 may be higher, for example. However, in these cases, an active element is doped such that the above formula (1) is satisfied.

Specifically, in the invention, an amount of an active element to be doped and an area in which an active element is doped can be appropriately changed as long as an active element is doped at a higher concentration in at least a part of an area where the power of light of the LP01 mode is larger than that of light of the LP11 mode than at least a part of an area where the power of light of the LP11 mode is larger than that of light of the LP01 mode such that the above formula (1) is satisfied when light of the LP01 mode and light of the LP11 mode are standardized by power.

In the embodiment described above, the second core portion 11b is provided on the outer peripheral side of the boundary between the area AR01 and the area AR11, and the peak of the power of light of the LP11 mode is positioned in the second core portion 11b. However, the invention is not limited thereto, and the second core portion 11b may be provided such that the boundary between the first core portion 11a and the second core portion 11b is in the area AR01. Alternatively, the second core portion 11b may be provided such that the peak of the power of light of the LP11 mode is in the area AR01. Specifically, the amplification optical fiber of the invention can be appropriately changed as long as the amplification optical fiber includes a first core portion covering the center area of the core and a second core portion surrounding the first core portion, the refractive index of the first core portion is higher than that of the clad, and the refractive index of the second core portion is higher than the refractive index of the first core portion.

EXAMPLES

Hereinafter, the contents of the invention will be described more specifically with reference to Examples and Comparative Examples. However, the invention is not limited thereto.

Example 1

An amplification optical fiber similar to the amplification optical fiber 10 according to the above embodiment is simulated. For the amplification optical fiber, the diameter of the first core portion is set to 20 μm and the outer diameter of the second core portion is set to 26 μm. In addition, the relative refractive index difference of the first core portion with respect to the clad is set to 0.12, and the relative refractive index difference of the second core portion with respect to the clad is set to 0.20.

Under such conditions, light having a wavelength of 1060 nm enters the core. Then, the position where the power of light of the LP01 mode and the power of light of the LP11 mode are identical when the light of the LP01 mode and the light of the LP11 mode are standardized by power is 8.2 μm from the center (an annular shape having a diameter of 16.4 μm). The effective area of light propagating through the amplification optical fiber is 570.46 μm$^2$.

Therefore, an amplification optical fiber of a length of 5 m in which an area in which ytterbium is doped is set to be an area having a diameter of 16.4 μm and a center at the center of the core is assumed. The power of light to enter the core of the amplification optical fiber is set to 10 W, the power of pumping light is set to 1200 w, and the absorption amount of the pumping light is set to 1 dB/m. In addition, light of the LP01 mode and light of the LP11 mode are excited at the same ratio at the incident end of the amplification optical fiber. Under these conditions, the amplification optical fiber satisfies the above formula (1), and in light emitted from the amplification optical fiber when light of other modes is not excited, the power of light of the LP01 mode is 374 W and the power of light of the LP11 mode is 46 W. The power of the whole emitted light is 420 W.

Comparative Example 1

An amplification optical fiber including a core, which has a diameter similar to the outer diameter of the second core portion of the Example 1, the whole of which is uniform, and of which the relative refractive index difference with respect to the clad is 0.12 is simulated.

Under such conditions, light having a wavelength of 1060 nm enters the core. Then, the position where the power of light of the LP01 mode and the power of light of the LP11 mode are identical when the light of the LP01 mode and the light of the LP11 mode are standardized by power is 6.8 μm from the center (an annular shape having a diameter of 13.6 μm). The effective area of light propagating through the amplification optical fiber is 363.94 μm$^2$.

Therefore, light enters an amplification optical fiber under conditions similar to Example 1 except that an area in which ytterbium is doped is set to be an area having a diameter of 13.6 μm and a center at the center of the core. Under these conditions, in light emitted from the amplification optical fiber, the power of light of the LP01 mode is 302 W and the power of light of the LP11 mode is 37 W. The power of the whole emitted light is 319 W.

Comparative Example 2

An amplification optical fiber similar to Comparative Example 1 except that an area in which ytterbium is doped is set the same as that of Example 1. Similarly to Example 1, light enters the amplification optical fiber. At this time, in light emitted from the amplification optical fiber, the power of light of the LP01 mode is 352 W and the power of light of the LP11 mode is 65 W. The power of the whole emitted light is 417 W.

Since both of Example 1 and Comparative Example 1 satisfy the above formula (1), a difference of the beam qualities is not large and light with a good beam quality can be emitted as a result of the both examples. However, as is clear from the result of Example 1 and Comparative Example 1, in the amplification optical fiber of Example 1, which is an amplification optical fiber of the invention, an area in which a rare-earth element can be doped can be expanded by expanding an area that satisfies the above formula (1) in comparison with the amplification optical fiber described in Comparative Example 1. Therefore, the amplification optical fiber of Example 1, which is an amplification optical fiber of the invention, results in larger power of emitted light of the LP01 mode in comparison with the amplification optical fiber described in Comparative Example 1.

Note that the area in which a rare-earth element is doped in Example 1 has an area of 211 μm² in the cross-section of the fiber while the area in which a rare-earth element is doped in Comparative Example 1 is an area of 145 μm² in the cross-section of the fiber. When the concentration of the rare-earth element is uniform, the adsorption amount of the pumping light per unit length is proportional to the cross-sectional area of the area in which the rare-earth element is doped, and thus the adsorption amount in Example 1 is 1.46 times the adsorption amount in Comparative Example 1. Therefore, in Example 1, the fiber length required to obtain an equivalent gain of light of the LP01 mode can be 76% of such a fiber length in Comparative Example 1 considering the overlap with the power distribution of light of the LP01 mode.

On the other hand, as a result of Comparative Example 2, the power of the whole emitted light is almost the same as that of Example 1. However, since Comparative Example 2 does not satisfy the above formula (1), Comparative Example 2 results in worse beam quality than that of Example 1 as is clear from the power ratio of emitted light of the LP01 mode and emitted light of the LP11 mode.

As described above, it is confirmed that an amplification optical fiber according to the invention can emit light having high power with an improved beam quality, and it is considered that an optical fiber amplifier using such an amplification optical fiber can output light with a good beam quality.

According to the invention, an amplification optical fiber capable of outputting light with a good beam quality even when light of the LP11 mode other than light of the LP01 mode is excited and a fiber laser device using the same are provided, and they can be can be utilized in a processing machine, for example.

REFERENCE SIGNS LIST 1, 2 . . . fiber laser device
10 . . . amplification optical fiber
11 . . . core
11a . . . first core portion
11b . . . second core portion
12 . . . inner clad
13 . . . outer clad
14 . . . coating layer
20 . . . seed light source
30 . . . pumping light source
40 . . . optical combiner
AR01, AR11 . . . area

The invention claimed is:

1. An amplification optical fiber comprising: a core; and a clad surrounding the core, the amplification optical fiber allowing light having a predetermined wavelength to propagate in at least an LP01 mode and an LP11 mode, wherein
the core includes a first core portion covering a center area of the core and a second core portion surrounding the first core portion,
a refractive index of the first core portion is higher than that of the clad,
a refractive index of the second core portion is higher than that of the first core portion,
when light of the LP01 mode and light of the LP11 mode are standardized by power, in the core, an active element that stimulates to emit light of the predetermined wavelength is doped at a higher concentration in at least a part of an area where power of light of the LP01 mode is larger than that of light of the LP11 mode than at least a part of an area where the power of light of the LP11 mode is larger than that of light of the LP01 mode to satisfy the formula:

$$\int_0^\infty n(r) \times \{I_{01}(r) - I_{11}(r)\} r dr > 0$$

wherein, r represents a distance from the center in the radial direction of the core, $I_{01}(r)$ represents the power of light of the LP01 mode at the distance r from the center in the radial direction of the core, $I_{11}(r)$ represents the power of light of the LP11 mode at the distance r from the center in the radial direction of the core, and n(r) represents an additive concentration of the active element at the distance r from the center in the radial direction of the core.

2. The amplification optical fiber according to claim 1, wherein the second core portion is formed on an outer peripheral side of a position where the power of light of the LP01 mode and the power of light of the LP11 mode are identical when light of the LP01 mode and light of the LP11 mode are standardized by power.

3. The amplification optical fiber according to claim 2, wherein a peak of the power of light of the LP11 mode is positioned in the second core portion when light of the LP11 mode is standardized by power.

4. The amplification optical fiber according to claim 2, wherein an average concentration of the active element doped in the first core portion is higher than an average concentration of the active element in the second core portion.

5. The amplification optical fiber according to claim 4, wherein the active element is not doped in the second core portion.

6. The amplification optical fiber according to claim 5, wherein the active element is doped in an area from the center of the core to a position where the power of light of the LP01 mode and the power of light of the LP11 mode are identical when light of the LP01 mode and light of the LP11 mode are standardized by power.

7. The amplification optical fiber according to claim 6, wherein the active element is doped at a uniform concentration.

8. The amplification optical fiber according to claim 1, wherein the active element is doped in an area from the center of the core to a predetermined position at a uniform concentration.

9. The amplification optical fiber according to claim 8, wherein the predetermined position is set to be position where the power of light of the LP01 mode and the power of light of the LP11 mode are identical when light of the LP01 mode and light of the LP11 mode are standardized by power.

10. The amplification optical fiber according to claim 9, wherein the active element is not doped in an area where the power of light of the LP11 mode is larger than that of light of the LP01 mode when light of the LP01 mode and light of the LP11 mode are standardized by power.

11. A fiber laser device comprising:
the amplification optical fiber according to claim 1;
a seed light source which inputs seed light to the amplification optical fiber; and
a pumping light source which outputs pumping light pumping the active element of the amplification optical fiber.

12. A fiber laser device comprising:
the amplification optical fiber according to claim 1;
a pumping light source which outputs pumping light pumping the active element of the amplification optical fiber;
a first FBG which is provided on one side of the amplification optical fiber and reflects light with at least a part of a wavelength of light emitted by the active element pumped by the pumping light; and
a second FBG which is provided on the other side of the amplification optical fiber and reflects light with the same wavelength as the light, reflected by the first FBG, at a lower reflectance than the first FBG.

13. The amplification optical fiber according to claim 3, wherein an average concentration of the active element doped in the first core portion is higher than an average concentration of the active element in the second core portion.

* * * * *